(12) United States Patent
Ohashi

(10) Patent No.: US 11,349,417 B2
(45) Date of Patent: May 31, 2022

(54) MOTOR CONTROL APPARATUS, IMAGE READING APPARATUS AND IMAGE FORMING APPARATUS

(71) Applicant: CANON KABUSHIKI KAISHA, Tokyo (JP)

(72) Inventor: Yohei Ohashi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/914,697

(22) Filed: Jun. 29, 2020

(65) Prior Publication Data

US 2021/0013817 A1  Jan. 14, 2021

(30) Foreign Application Priority Data

Jul. 10, 2019 (JP) .............................. JP2019-128655

(51) Int. Cl.
*H02P 6/185* (2016.01)
*H02P 6/22* (2006.01)

(52) U.S. Cl.
CPC ................ *H02P 6/185* (2013.01); *H02P 6/22* (2013.01)

(58) Field of Classification Search
CPC ........ G03G 15/80; G03G 15/00; H02P 21/18; H02P 6/185; H02P 8/22; B65H 7/02; B65H 5/06
See application file for complete search history.

(56) References Cited

U.S. PATENT DOCUMENTS

| 7,334,787 | B2 * | 2/2008 | Akiyama | ............. | B65H 3/0669 |
|---|---|---|---|---|---|
| | | | | | 271/10.02 |
| 2004/0258437 | A1 * | 12/2004 | Kakutani | ........... | G03G 15/5058 |
| | | | | | 399/301 |
| 2005/0099153 | A1 * | 5/2005 | Komatsu | .................. | H02P 6/15 |
| | | | | | 318/807 |
| 2011/0064500 | A1 * | 3/2011 | Takahashi | ................ | B65H 5/34 |
| | | | | | 399/396 |
| 2016/0360046 | A1 * | 12/2016 | Katayama | ............ | H04N 1/0057 |
| 2018/0167009 | A1 * | 6/2018 | Suzuki | .................... | H02P 21/34 |
| 2019/0305700 | A1 * | 10/2019 | Prokop | .................. | H02P 6/182 |
| 2019/0386596 | A1 | 12/2019 | Ohashi | | |

FOREIGN PATENT DOCUMENTS

JP  2005-039955 A  2/2005

\* cited by examiner

*Primary Examiner* — Said Bouziane
(74) *Attorney, Agent, or Firm* — Venable LLP

(57) ABSTRACT

A motor control apparatus operable to control a motor includes a phase determiner for determining a rotational phase of a rotor of the motor, and a controller having a first control mode for controlling a driving current flowing through a winding of the motor based on a current of a predetermined magnitude, and a second control mode for controlling a driving current flowing through the winding so that a deviation between a command phase representing a target phase of the rotor and a rotational phase determined by the phase determiner is reduced. The controller executes the first control mode without executing the second control mode in a case of rotating the motor in a first direction, and executes the second control mode in a case of rotating the motor in a second direction which is a reverse direction to the first direction.

22 Claims, 8 Drawing Sheets

MOTOR CONTROL APPARATUS, IMAGE READING APPARATUS AND IMAGE FORMING APPARATUS

BACKGROUND OF THE INVENTION

Field of the Invention

The present invention relates to drive control of a motor in a motor control apparatus, an image reading apparatus, and an image forming apparatus.

Description of the Related Art

In an image forming apparatus having a sheet conveyance apparatus that conveys a sheet such as a printing medium or a document, a stepping motor (hereinafter referred to as a "motor") is widely used as a driving source of a conveying system for conveying the sheet. As a control method for driving control of a motor, a control method called vector control (or FOC (Field Oriented Control)) has been proposed.

In the vector control as described above, it is necessary to detect the rotational phase of a rotor of the motor. By obtaining the rotational phase of the rotor based on a counter-electromotive voltage induced in the windings of each phase of the motor, it is possible to realize sensorless vector control which does not use a position sensor such as an encoder. However, when a permanent magnet is used in a rotor, a counter-electromotive voltage is not generated and the rotational phase of the rotor cannot be detected in a state in which the rotor is not rotating, and therefore it is not possible to use vector control when starting the motor. Therefore, Japanese Patent Laid-Open No. 2005-39955 proposes a technique for, after starting drive control of a motor in synchronous control, switching from synchronous control to vector control.

In a case of switching between vector control and synchronous control as described above, when switching from the vector control mode to the synchronous control mode in order to stop rotation of a rotor of the motor, the control mode ends up being switched in a state where deviation between a command phase and a rotational phase remains. This deviation will remain until the rotor of the motor stops. As a result, the rotation amount of the rotor of the motor is a different to a predetermined rotation amount. That is, it becomes impossible to control the rotation amount of the rotor of the motor with high accuracy. This, leads to a decrease in positioning accuracy when controlling the position of a moving object by driving a cam mechanism by a motor for example. Thus, when the motor is used as a driving source for positioning of the moving object, there is a problem in that the positioning accuracy of the moving object suffers due to the application of vector control.

SUMMARY OF THE INVENTION

The present invention has been made in view of the above problems. The present invention provides a technique for preventing positioning accuracy from suffering when using a motor as a driving source for positioning a moving object.

According to one aspect of the present invention, there is provided a motor control apparatus operable to control a motor, comprising: a phase determiner for determining a rotational phase of a rotor of the motor; and a controller having a first control mode for controlling a driving current flowing through a winding of the motor based on a current of a predetermined magnitude, and a second control mode for controlling a driving current flowing through the winding so that a deviation between a command phase representing a target phase of the rotor and a rotational phase determined by the phase determiner is reduced, wherein the controller executes the first control mode without executing the second control mode in a case of rotating the motor in a first direction, and executes the second control mode in a case of rotating the motor in a second direction which is a reverse direction to the first direction.

According to another aspect of the present invention, there is provided a motor control apparatus operable to control a motor, comprising: a speed determiner configured to determine a rotational speed of a rotor of the motor; and a controller having a first control mode for controlling a driving current flowing through the winding based on a current of a predetermined magnitude, and a second control mode for controlling a driving current flowing through the winding so that a deviation between a command speed representing a target speed of the rotor and a rotational speed determined by the speed determiner is reduced, wherein the controller executes the first control mode without executing the second control mode in a case of rotating the motor in a first direction, and executes the second control mode in a case of rotating the motor in a second direction which is a reverse direction to the first direction.

According to still another aspect of the present invention, there is provided an image reading apparatus comprising: a conveying roller configured to convey a document; a first reading device configured to read, at a reading position, an image of a document conveyed by the conveying roller; a discharging roller configured to discharge the document whose image was read by the first reading device; and a motor configured to drive a first load by rotating in a first direction and to drive a second load by rotating in a second direction that is a reverse direction to the first direction; and a motor control apparatus configured to control the motor, wherein the motor control apparatus comprising: a phase determiner for determining a rotational phase of a rotor of the motor; and a controller having a first control mode for controlling a driving current flowing through a winding of the motor based on a current of a predetermined magnitude, and a second control mode for controlling a driving current flowing through the winding so that a deviation between a command phase representing a target phase of the rotor and a rotational phase determined by the phase determiner is reduced, wherein the controller executes the first control mode without executing the second control mode in a case of rotating the motor in a first direction, and executes the second control mode in a case of rotating the motor in a second direction which is a reverse direction to the first direction.

According to yet another aspect of the present invention, there is provided an image reading apparatus, comprising: a conveying roller configured to convey a document; a first reading device configured to read, at a reading position, an image of a document conveyed by the conveying roller; a discharging roller configured to discharge the document whose image was read by the first reading device; and a motor configured to drive a first load by rotating in a first direction and to drive a second load by rotating in a second direction that is a reverse direction to the first direction; and a motor control apparatus configured to control the motor, wherein the motor control apparatus comprising: a speed determiner configured to determine a rotational speed of a rotor of the motor; and a controller having a first control mode for controlling a driving current flowing through the winding based on a current of a predetermined magnitude, and a second control mode for controlling a driving current flowing through the winding so that a deviation between a command speed representing a target speed of the rotor and a rotational speed determined by the speed determiner is reduced, wherein the controller executes the first control mode without executing the second control mode in a case of rotating the motor in a first direction, and executes the second control mode in a case of rotating the motor in a second direction which is a reverse direction to the first direction.

According to still another aspect of the present invention, there is provided an image forming apparatus, comprising: an image forming unit configured to form an image on a printing medium; and a conveying roller configured to convey the printing medium; a motor configured to drive a first load by rotating in a first direction and to drive a second load by rotating in a second direction that is a reverse direction to the first direction; and a motor control apparatus configured to control the motor, wherein the motor control apparatus comprising: a phase determiner for determining a rotational phase of a rotor of the motor; and a controller having a first control mode for controlling a driving current flowing through a winding of the motor based on a current of a predetermined magnitude, and a second control mode for controlling a driving current flowing through the winding so that a deviation between a command phase representing a target phase of the rotor and a rotational phase determined by the phase determiner is reduced, wherein the controller executes the first control mode without executing the second control mode in a case of rotating the motor in a first direction, and executes the second control mode in a case of rotating the motor in a second direction which is a reverse direction to the first direction.

According to yet another aspect of the present invention, there is provided an image forming apparatus, comprising: an image forming unit configured to form an image on a printing medium; and a conveying roller configured to convey the printing medium; a motor configured to drive a first load by rotating in a first direction and to drive a second load by rotating in a second direction that is a reverse direction to the first direction; and a motor control apparatus configured to control the motor, wherein the motor control apparatus comprising: a speed determiner configured to determine a rotational speed of a rotor of the motor; and a controller having a first control mode for controlling a driving current flowing through the winding based on a current of a predetermined magnitude, and a second control mode for controlling a driving current flowing through the winding so that a deviation between a command speed representing a target speed of the rotor and a rotational speed determined by the speed determiner is reduced, wherein the controller executes the first control mode without executing the second control mode in a case of rotating the motor in a first direction, and executes the second control mode in a case of rotating the motor in a second direction which is a reverse direction to the first direction.

Further features of the present invention will become apparent from the following description of exemplary embodiments (with reference to the attached drawings).

DESCRIPTION OF THE EMBODIMENTS

Figure 1:
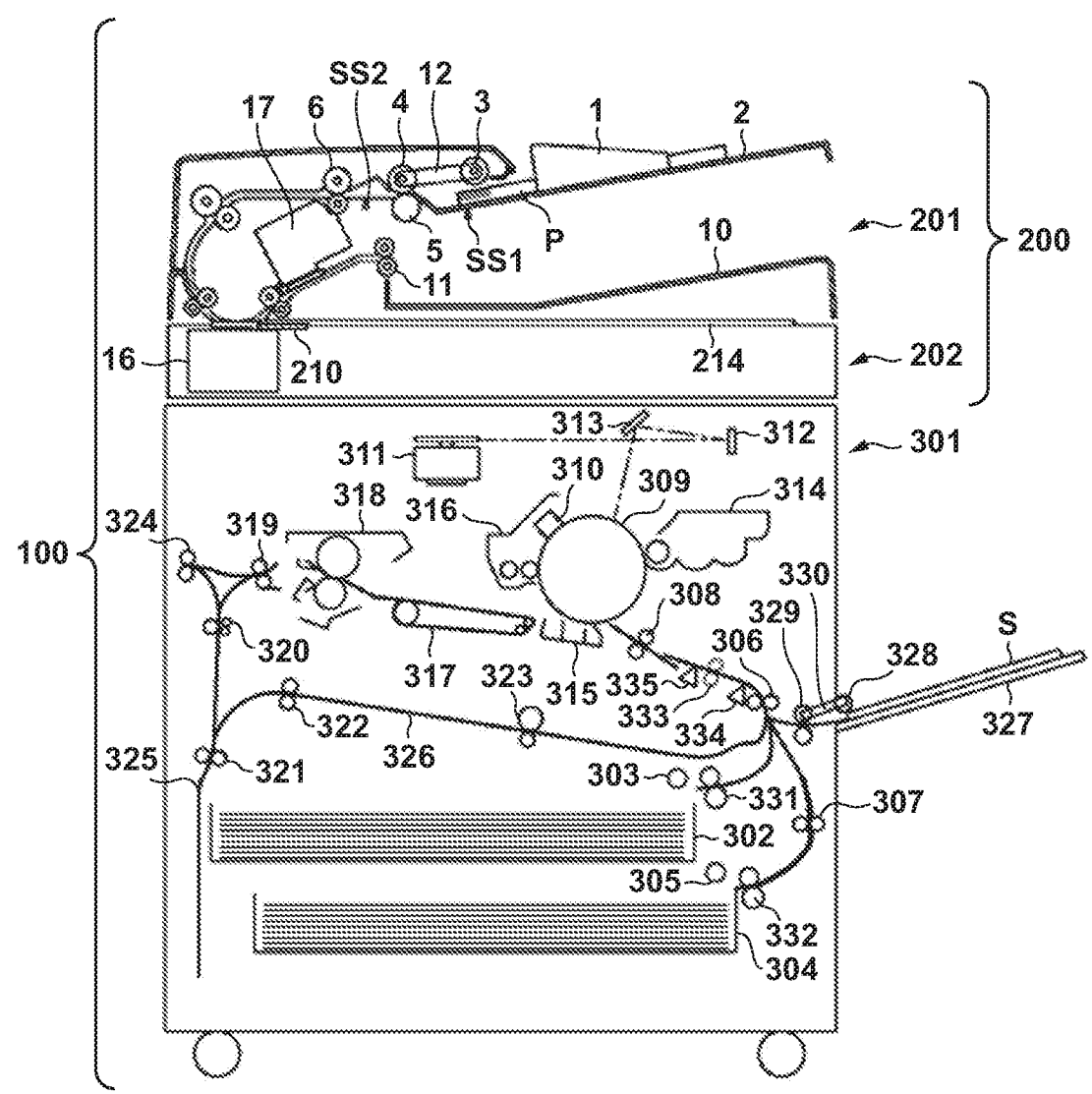
FIG. 1 shows an example of an overall configuration of an image reading apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the following embodiment, a case where a motor control apparatus is provided in an image forming apparatus having a sheet conveyance apparatus for conveying a sheet of a printing medium, a document, or the like will be described. The image forming apparatus may be, for example, a multi-function device, a copying machine, a facsimile apparatus, a printer, or the like. Further, although an example in which the motor control apparatus of the present invention is applied to a two-phase stepping motor is described, the motor control apparatus of the present invention does not depend on the number of phases and the type of motor, and is also applicable to, for example, a three-phase brushless DC motor or the like.

[Image Forming Apparatus]

First, a configuration example of the image forming apparatus 100 in which the motor control apparatus is installed will be described with reference to FIG. 1. As shown in FIG. 1, the image forming apparatus 100 of the present embodiment comprises an image reading apparatus 200 that reads an image of a document, and an image printing apparatus 301 that forms an image on a printing medium.

<Document Reading Apparatus>

The image reading apparatus 200 is provided with a document feeding apparatus 201 for feeding a document to a read position. Documents P stacked in a document stacking unit (document tray) 2 of the document feeding apparatus 201 are fed one by one by a pickup roller 3, and are then conveyed by a sheet feeding roller 4. At a position facing the sheet feeding roller 4, a separation roller 5 that presses against the sheet feeding roller 4 is provided. The separation roller 5 is configured to rotate when a load torque equal to or greater than a predetermined torque is applied to the separation roller 5, and has a function of separating documents fed in a state in which two of them are overlapped.

The pickup roller 3 and the sheet feeding roller 4 are coupled to each other by a swing arm 12. The swing arm 12 is supported by the rotation axis of the sheet feeding roller 4 so as to be rotatable about the rotation axis of the sheet feeding roller 4.

The document P is conveyed by a sheet feeding roller 4 or the like, and is discharged to a sheet discharge tray 10 by a sheet discharge roller 11. As shown in FIG. 1, a document set sensor SS1 for detecting whether or not a document is stacked in the document stacking unit 2 is provided in the document stacking unit 2. In addition, a sheet sensor SS2 that detects the front end of the document (detects the presence or absence of the document) is provided in the conveying path through which the document passes.

A document reading apparatus 202 is provided with a document reading unit 16 for reading an image of a first surface of a document that is conveyed. Image information read by the document reading unit 16 is outputted to the image printing apparatus 301. The image printing apparatus 301 comprises an image forming unit that, upon receiving image information from the document reading apparatus 202, prints (forms) an image on a printing medium based on the image information.

In addition, the image reading apparatus 200 is provided with a document reading unit 17 for reading an image of a second surface of a document that is conveyed. The image information read by the document reading unit 17 is outputted to the image printing apparatus 301 in a similar manner to the method described for the document reading unit 16.

Reading of a document is performed as described above. That is, the document feeding apparatus 201 and the document reading apparatus 202 function as a document reading apparatus (image reading apparatus).

The image reading apparatus 200 has a fixed reading mode and a flow reading mode as document reading modes. The fixed reading mode is a mode in which an image of a document placed (fixed) on a document platen glass 214 is read by the document reading unit 16 moving at a constant speed. The flow reading mode is a mode for performing flow reading of a document. That is, the flow reading mode is a mode in which a front image (and a back image) of a document fed from the document tray 2 and conveyed at a constant speed is read by the document reading unit 16 (and the document reading unit 17) which are fixed at predetermined positions.

Figure 2A:
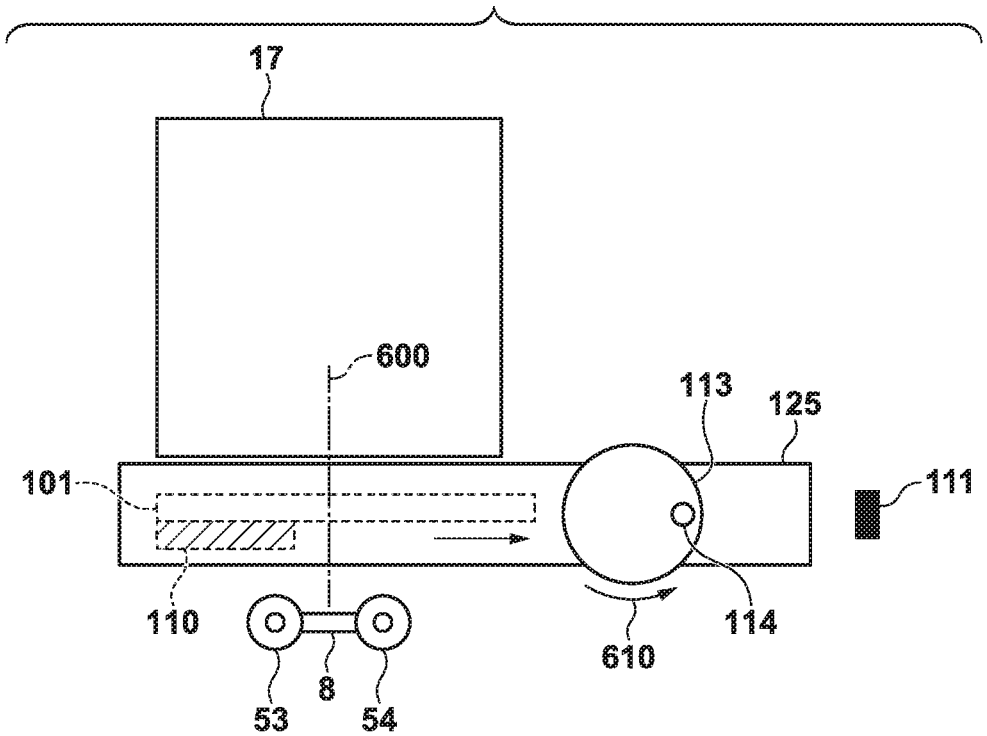
FIG. 2A and FIG. 2B are block diagrams showing examples of control configurations of the image reading apparatus.
Figure 2B:
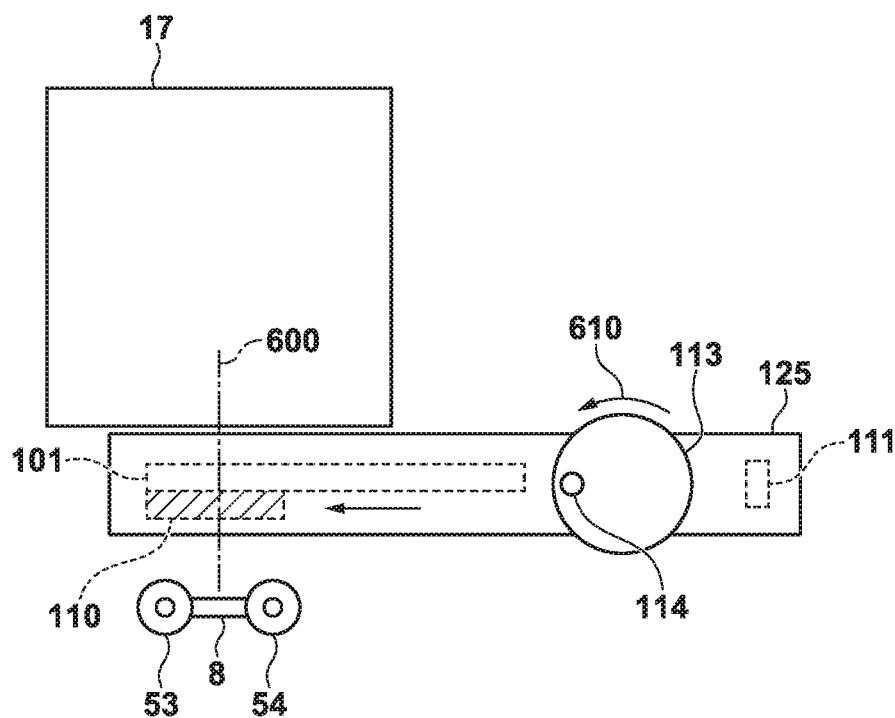

FIG. 2A and FIG. 2B show a configuration of the document reading unit 17.

The document reading unit 17, at a read position 600, reads, through a glass unit 125 (a glass member) that includes a flow reading glass 101 and a shading white plate 110, an image of a document conveyed between the glass unit 125 and a facing member 8 by conveying rollers 53 and 54.

The glass unit 125 in the present embodiment is configured to be movable. FIG. 2A and FIG. 2B show states in which the glass unit 125 is stopped at a first stop position and a second stop position, respectively.

As shown in FIG. 2A, when the glass unit 125 is stopped at the first stop position, the document reading unit 17 can read an image (back image) of the document through the flow reading glass 101.

As shown in FIG. 2B, when the glass unit 125 is stopped at the second stop position, the shading white plate 110 is positioned at the read position 600. In this case, the document reading unit 17 can read the shading white plate 110 through the flow reading glass 101.

The movement mechanism of the glass unit 125 will be described later.

(Shading Control)

The shading white plates 210 and 110 are white plates used to generate reference data for a white level in accordance with shading (shading correction).

The shading white plate 210 is provided fixed between the flow reading glass and the document platen glass 214. The document reading unit 16 is moved in accordance with the driving of an optical system motor 226, and the document reading unit 16 is stopped at a position facing the shading white plate 210, so that the shading white plate 210 can be read by the document reading unit 16. Before the start of reading of the document, the shading white plate 210 is read by the document reading unit 16, and image processing is performed on the obtained image data to thereby generate reference data for reading by the document reading unit 16.

Figure 3:
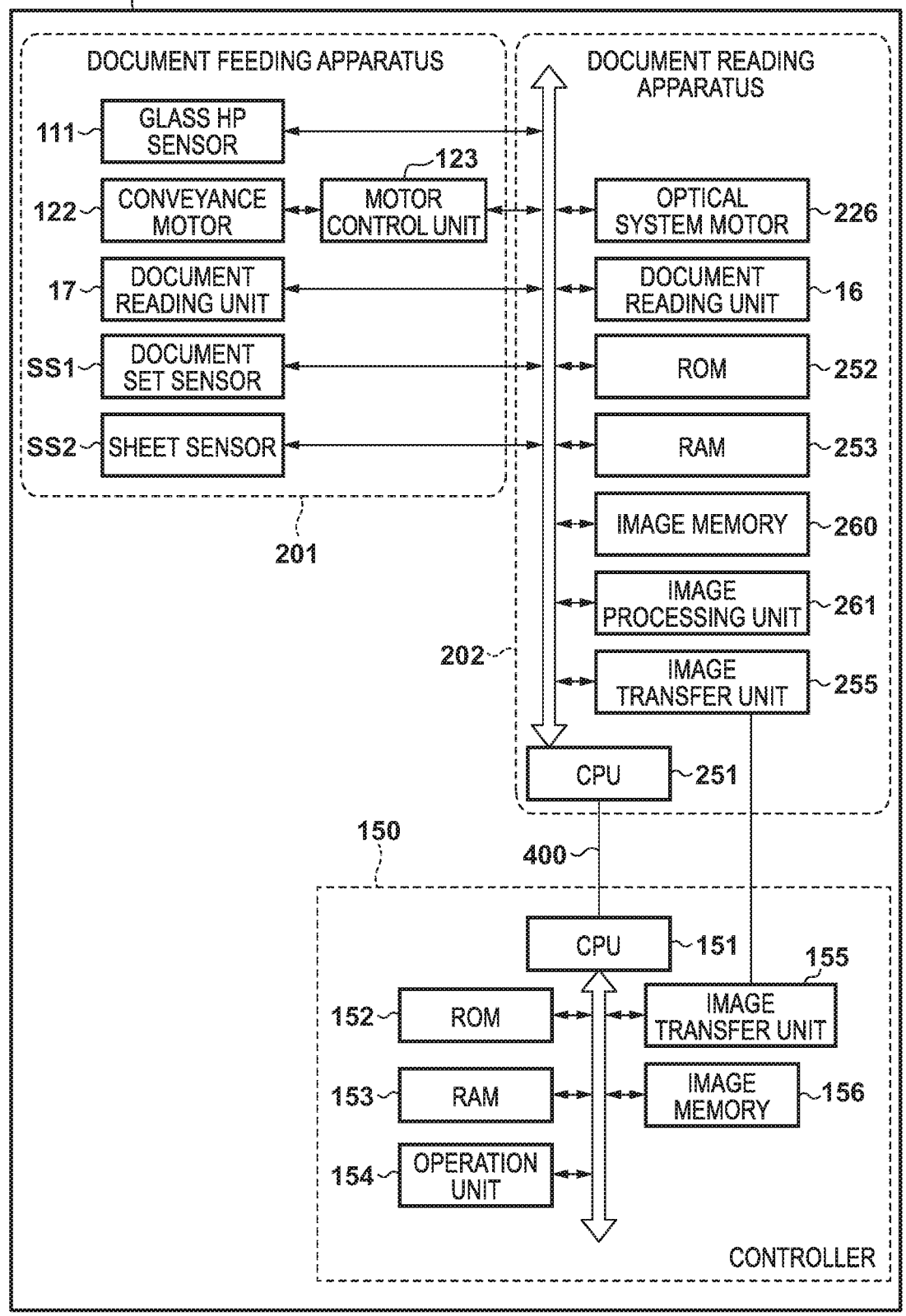
FIG. 3 is a block diagram showing a configuration example of a motor control unit.

The shading white plate 110 is affixed to the flow reading glass 101. The document reading unit 17 is fixed at the position shown in FIG. 1, but the flow reading glass 101 is configured to be able to move in accordance with the motor 122 (FIG. 3). The flow reading glass 101 is moved in accordance with driving of the motor 122, and the flow reading glass 101 is stopped so that the shading white plate 110 is positioned at a position facing the document reading unit 17. By this, it is possible for the document reading unit 17 to read the shading white plate 110. Before the start of reading of the document, the shading white plate 110 is read by the document reading unit 17, and image processing is performed on the obtained image data to thereby generate reference data for reading by the document reading unit 17.

Based on the reference data generated as described above, correction of the read image obtained by reading by the document reading unit 16 and correction of the read image obtained by reading by the document reading unit 17 are performed after reading of the document is completed.

<Control Configuration>

FIG. 3 is a block diagram showing an example of a control configuration of the image reading apparatus 200. The document reading apparatus 202 comprises a CPU 251, and a controller 150 comprises a CPU 151. The CPU 251 and the CPU 151 are connected via a communication line 400. As shown in FIG. 3, in the present embodiment, the document feeding apparatus 201 comprises the motor 122 and a motor control unit 123 (motor control apparatus).

The CPU 251 comprehensively controls the respective units of the document reading apparatus 202 and the document feeding apparatus 201. A ROM 252 stores control programs to be executed by the CPU 251. A RAM 253 is used as a work region by the CPU 251. The CPU 251 is communicably connected to the document reading unit 16, the document reading unit 17, the optical system motor 226, the glass HP sensor 111, an image memory 260, an image processing unit 261, and an image transfer unit 255 in order to realize an image reading function.

The image memory 260 is a storage device for temporarily storing image data (read images) obtained by reading by the document reading units 16 and 17. The image processing unit 261 performs image processing (for example, a shading correction) on a read image stored in the image memory 260. The image transfer unit 255 transfers the image data after the image processing by the image processing unit 261 to an image transfer unit 155 of the controller 150.

The CPU 251 is connected to the motor control unit 123 (motor control apparatus) which controls the driving of the motor (conveyance motor) 122. In the present embodiment, the motor 122 is used as a driving source for rotating various rollers in the document feeding apparatus 201 and as a driving source for moving the flow reading glass 101 (the glass unit 125 of FIG. 2A and FIG. 2B).

The CPU 251 controls the driving of the motor 122 via the motor control unit 123. The motor control unit 123 controls the motor 122 in accordance with a command outputted from the CPU 251. The motor 122 drives a load which is a driving target. In the present embodiment, as described above, the various rollers used for conveying the document in the document feeding apparatus 201 correspond to loads driven by the motor 122. In the present embodiment, the flow reading glass 101 (the glass unit 125 in FIGS. 2A and 2B) also corresponds to a load which is driven by the motor 122. The motor control unit 123 of the present embodiment can be applied to a motor that drives each of these loads. Although only one motor control unit 123 and one motor 122 are shown in FIG. 3, the image reading apparatus 200 may have a configuration in which one motor control unit controls a plurality of motors.

The CPU 251 corresponds to an external (higher level) controller of the motor control unit 123, and generates a command value (command phase θ_ref) for a phase (rotational phase) of a rotor of the motor 122 which is a control target of the motor control unit 123 and generates a command value DIR for a rotational direction. The CPU 251 outputs the generated command values to the motor control unit 123. For example, the command phase θ_ref is a pulse-shaped rectangular wave signal, where one pulse defines a minimum change amount of the rotation angle of the stepping motor. Note that the command value for the rotational speed of the motor (speed command value ω_ref) is obtained as a frequency that corresponds to θ_ref. When starting the driving sequence of the motor 122, the CPU 251 outputs the generated command phase θ_ref to the motor control unit 123 at a predetermined time cycle (control cycle). The motor control unit 123 executes the position control and the speed control of the motor 122 according to the command phase provided by the CPU 251.

The controller 150 controls the image reading apparatus 200 overall, including the document feeding apparatus 201 and the document reading apparatus 202. The CPU 151 comprehensively controls the units of the controller 150. A ROM 152 stores control programs to be executed by the CPU 151. A RAM 153 is used as a work region by the CPU 151. The image transfer unit 155 receives the image data from the image transfer unit 255 and stores the image data in an image memory 156. An operation unit 154 includes an input device for accepting an instruction from a user, and a display device for displaying an operation screen.

The CPU 151 transmits and receives control commands and control data to and from the CPU 251 through the communication line 400. For example, when the CPU 151 accepts an instruction to start image reading from a user through the operation unit 154, it transmits a control command for starting the image reading to the CPU 251 through the communication line 400. Upon accepting a document size setting instruction from the user via the operation unit 154, the CPU 151 transmits a document size setting (the sizes in the main scanning direction and the sub-scanning direction) to the CPU 251. When the CPU 151 receives an error occurrence notification from the CPU 251, it notifies the user by displaying a message corresponding to the type of error that occurred in the operation unit 154.

[Motor Control Apparatus]
<Overview of Vector Control>

Next, with reference to FIG. 4, an overview of vector control used in the drive control of the motor 122 by the motor control unit 123 (motor control apparatus) of the present embodiment will be described. In the present embodiment, the motor 122 is a stepping motor composed of two phases: A-phase (first phase) and B-phase (second phase). Incidentally, although a sensor (e.g., a rotary encoder) for detecting the rotational phase of the rotor 401 of the motor 122 is not provided in the motor 122, configuration may be such that a sensor for detecting the rotational phase is provided. In the following description, the control of the motor is performed based on the rotational phase θ, the command phase θ_ref or the like as electrical angles but, for example, an electrical angle may be converted into a mechanical angle, and control of the motor may be performed based on the mechanical angle.

Figure 4:
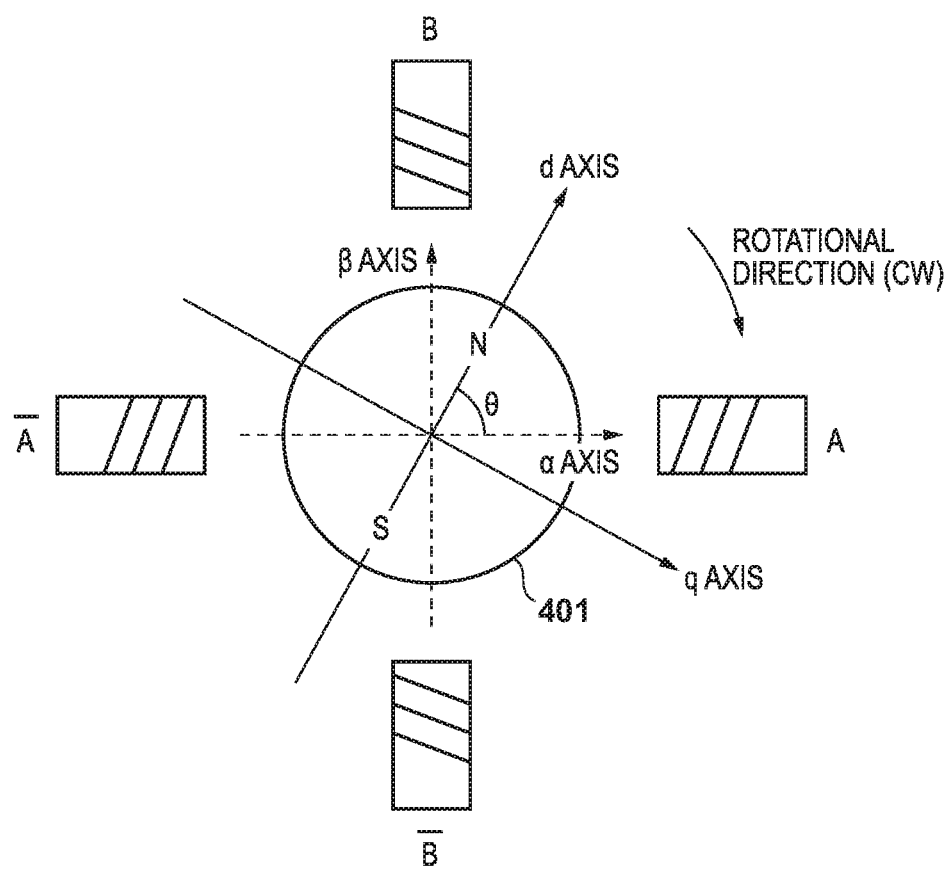
FIG. 4 illustrates a relationship between d and q axes of a motor and a rotating coordinate system.

FIG. 4 shows the relationship between the motor 122 and the rotating coordinate system represented by a d-axis and a q-axis. In FIG. 4, in the stationary coordinate system, an a axis is an axis corresponding to the windings of the A-phase, and a β axis is an axis corresponding to the windings of the B-phase are defined. Further, the d-axis is defined in the direction of the magnetic flux produced by the magnetic poles of the permanent magnet used in the rotor 401, and the q-axis is defined in a direction 90 degrees counterclockwise of the d-axis (a direction perpendicular to the d-axis). The angle formed between the α-axis and the d-axis is defined as θ, and the rotational phase of the rotor 401 is represented by an angle θ.

In the vector control, a rotating coordinate system with reference to the rotational phase θ of the rotor 401 is used. Specifically, a value of the current component in the rotating coordinate system of a current vector corresponding to the driving current flowing through the windings of the motor 122 is used. A current vector in the rotating coordinate system includes a q-axis component (torque current component) for generating a torque in the rotor 401 and a d-axis component (excitation current component) that affects the intensity of the magnetic flux through the windings. The value of the d-axis component and the value of the q-axis component of the current vector are used for vector control.

Vector control is a control method for controlling the motor by performing phase feedback control in which the value of the torque current component iq and the value of the excitation current component id are controlled so that the deviation between the command phase representing the target phase of the rotor 401 and the actual rotational phase is reduced. Also, vector control is a control method for controlling the motor by performing speed feedback control in which the value of the torque current component iq and the value of the excitation current component id are controlled so that the deviation between a command speed representing the target speed of the rotor 401 and the actual the rotational speed is reduced.

<Motor Control Unit>

Figure 5:
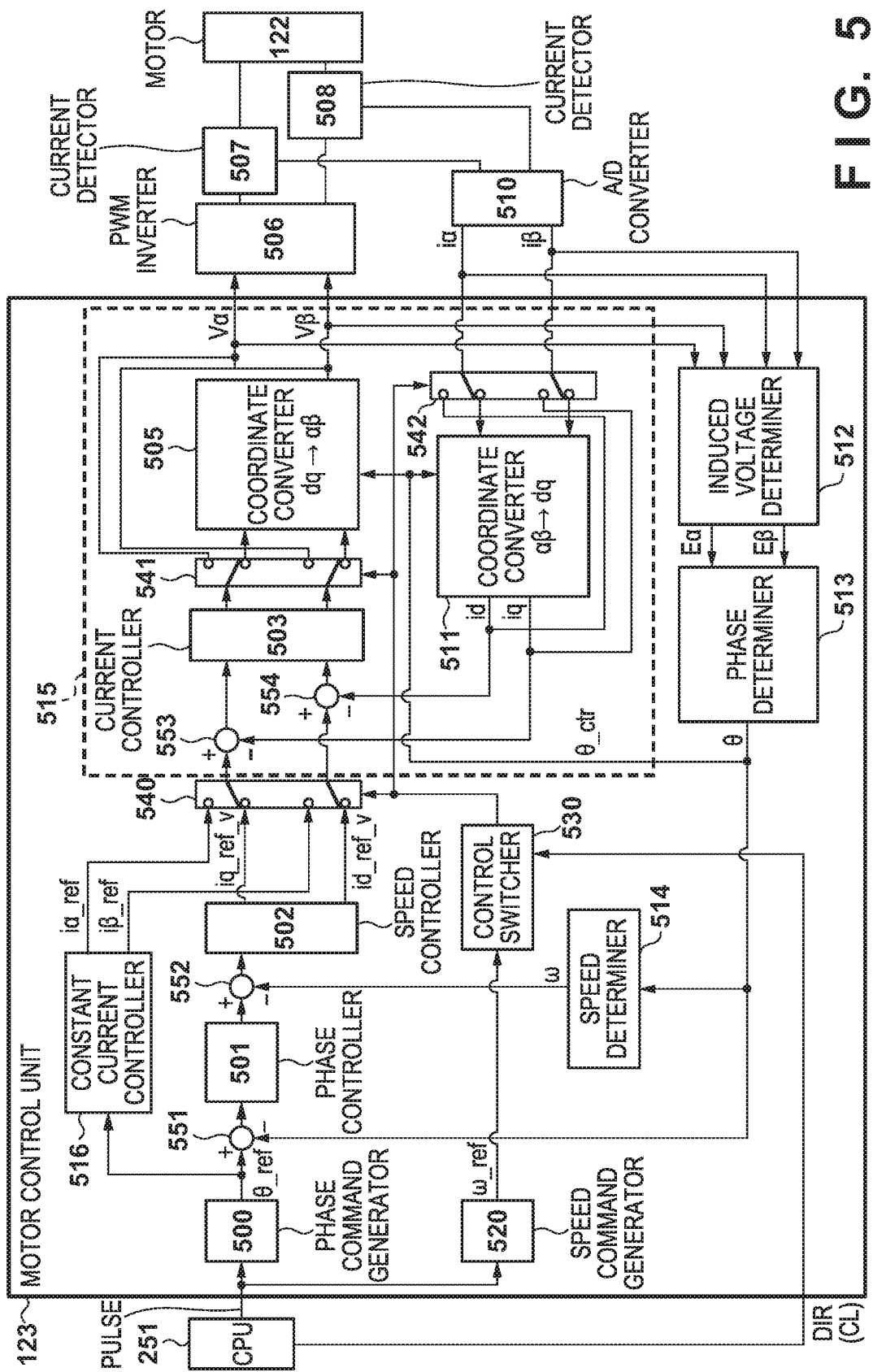
FIG. 5 shows an example of a configuration of a movement mechanism of a flow reading glass.

FIG. 5 is a block diagram showing a configuration example of the motor control unit 123 of the present embodiment. The motor control unit 123 takes as input from the CPU 251, which corresponds to a higher level controller, a drive pulse for controlling the rotational phase of the rotor 401 of the motor 122 (pulse signal) as a rotational phase command value. Further, the command value DIR of the rotational direction of the rotor 401 is also inputted from the CPU 251 to the motor control unit 123. In the present embodiment, the motor control unit 123 is configured by one or more processors such as CPUs. That is, the functions of the motor control unit 123 can be realized by software processing in which the CPU executes a program read from a memory such as a ROM. Incidentally, the motor control unit 123 may be configured by a circuit (e.g., at least one ASIC) for realizing a function that the motor control unit has.

The motor control unit 123 has, as control modes for controlling the motor 122, a synchronous control mode for performing synchronous control of the motor 122 (first control mode), and a vector control mode for performing vector control of the motor 122 (second control mode). The synchronous control mode is a control mode for controlling the driving current flowing through the windings by supplying a predetermined current to the windings of the motor 122. The vector control mode is a control mode for controlling the driving current flowing in the windings of the motor 122 based on the q-axis component and the d-axis component so that the deviation between a target phase represented by a drive pulse supplied from the CPU 251 and the rotational phase A determined by the phase determiner 513 is reduced.

The motor control unit 123 detects the drive pulse supplied from the CPU 251, and generates, from the detected drive pulse, a command value (command speed) ω_ref of the rotational speed of the rotor 401. The motor control unit 123 of the present embodiment switches the control mode based on the generated rotational speed ω_ref and the command value DIR inputted from the CPU 251.

As shown in FIG. 5, the motor control unit 123 has a phase controller 501, a speed controller 502, a current controller 503, coordinate converters 505 and 511, an induced voltage determiner 512, a phase determiner 513, a speed determiner 514, a constant current controller 516 (first control circuit), and subtractors 551 to 554. The motor control unit 123 further includes a phase command generator 500, a speed command generator 520, a control switcher 530, and switches 540 to 542. Further, between the motor control unit 123 and the motor 122, a PWM inverter 506, current detectors 507 and 508, and the A/D converter 510 are provided. Incidentally, the current controller 503, the coordinate converter 505 and 511, and the subtractors 553 and 554 configure a vector control unit 515 (second control circuit).

(Vector Control Mode)

First, description is given regarding the configuration and operation related to the vector control mode in the motor control unit 123. The motor control unit 123, in the vector control mode, outputs drive voltages Vα and Vβ for the motor 122 generated by the vector control unit 515 to the PWM inverter 506. The PWM inverter 506, in response to the drive voltages Vα and Vβ, supplies driving currents to the windings of the motor 122 to thereby drive the motor 122. The motor control unit 123 performs the vector control described above, in which it controls the driving currents supplied to the motor 122 according to the current value of the rotating coordinate system with reference to the rotational phase θ of the rotor 401 of the motor 122.

In the vector control, the current vector corresponding to the driving current flowing through the windings of the A-phase and B-phase of the motor 122 is converted from a stationary coordinate system represented by the α axis and the β axis to a rotating coordinate system represented by the d-axis and the q-axis. As the result of this conversion, the driving current supplied to the motor 122 is represented by a d-axis component (d-axis current) and a q-axis component (q-axis current) of direct current in the rotating coordinate system. In this case, q-axis current corresponds to the torque current component that generates torque to the motor 122, a current that contributes to the rotation of the rotor 401. The d-axis current corresponds to the excitation current component affecting the intensity of the magnetic flux of the rotor 401 of the motor 122.

The motor control unit 123 can independently control the q-axis component of the current vector (q-axis current) and the d-axis component (d-axis current). Thus, the torque required for the rotor 401 to rotate can be efficiently generated. Incidentally, d-axis current does not contribute to the generation of torque of the driving target motor. Therefore, if vector control is performed so not to supply the d-axis current to the motor, it is possible to increase the power efficiency of the drive control of the motor.

The motor control unit 123 determines (estimates) the rotational phase and the rotational speed w of the rotor 401 of the motor 122, and performs vector control based on the determination result. In the outermost control loop including the phase controller 501, phase control for the motor 122 is performed based on the determination result of the rotational phase θ of the rotor 401 of the motor 122.

A drive pulse supplied from the CPU 251 to the motor control unit 123 (output) is input to the phase command generator 500 and the speed command generator 520. A drive pulse, for example, is configured by a rectangular wave signal, and one pulse corresponds to a minimum change amount of the rotation angle of the motor 122 (stepping motor).

The phase command generator 500 detects a drive pulses supplied from the CPU 251, and from the detected drive pulse, generates a command phase θ_ref representing the target phase of the rotor 401 of the motor 122. The generated command phase θ_ref is output to the subtractor 551 and the constant current controller 516. The subtractor 551 calculates the deviation between the rotational phase θ and the command phase θ_ref of the rotor 401 of the motor 122, and outputs the deviation to the phase controller 501.

The speed command generator 520 detects a drive pulse supplied from the CPU 251, and from the detected drive pulse, generates a rotational speed ω_ref corresponding to a command value (command speed) for the rotational speed of the rotor 401 of the motor 122. The rotational speed ω_ref is output to the control switcher 530, and is used for switching the control mode, as described later.

The phase controller 501, based on proportional control (P), integral control (I), and differential control (D), generates and outputs a target rotational speed ω_tgt for the rotor 401 of the motor 122 so that the deviation output from the subtractor 551 is reduced. Specifically, the phase controller 501, based on the P control, I control, and D control, generates and outputs a target rotational speed ω_tgt so that the deviation outputted from the subtractor 551 becomes 0. Incidentally, P control is a control method for controlling a value that is the target of control based on a value proportional to the deviation between a command value and an estimated value. The I control is a control method for controlling a value that is the target of control based on a value proportional to a time integration of the deviation between a command value and an estimated value. The D control is a control method for controlling a value that is the target of control based on a value proportional to a temporal change of the deviation between a command value and an estimated value. The phase controller 501 in the present embodiment generates a target rotational speed ω_tgt based on the PID control, but is not limited thereto. For example, the phase controller 501 may generate a target rotational speed ω_tgt based on the PI control. In this way, the phase control of the motor 122 is performed by the phase controller 501.

In the control loop including the speed controller 502, speed control for the motor 122 is performed based on the determination (estimation) result of the rotational speed ω of the rotor 401 of the motor 122. The subtractor 552 calculates the deviation between the rotational speed ω and the target rotational speed ω_tgt of the rotor 401 of the motor 122, and outputs the deviation to the speed controller 502.

The speed controller 502, based on the PID control, generates the q-axis current command value iq_ref_v and the d-axis current command value id_ref_v so that the deviation output from the subtractor 552 becomes smaller, and outputs the generated values to the switch 540. Specifically, the speed controller 502, based on the PID control, generates the q-axis current command value iq_ref_v and the d-axis current command value id_ref_v so that the deviation outputted from the subtractor 552 becomes 0, and outputs the generated values. The speed controller 502 in the present embodiment generates the q-axis current command value iq_ref_v and the d-axis current command value id_ref_v based on the PID control, but the present invention is not limited thereto. For example, the speed controller 502 may generate the q-axis current command value iq_ref_v and the d-axis current command value id_ref_v based on the PI control. When a permanent magnet is used for the rotor 401 as in the present embodiment, the d-axis current command value id_ref_v which affects the intensity of the magnetic flux passing through the windings is usually set to 0, but this is not necessarily the case.

In the vector control mode, the current command values iq_ref_v and id_ref_v are output from the switch 540 to the vector control unit 515 as a q-axis current command value iq_ref and a d-axis current command value id_ref, respectively. In the synchronous control mode, the current command values iα_ref and iβ_ref for synchronous control are output from the switch 540 to the vector control unit 515. The current command values iα_ref_o and iβ_ref_o for synchronous control are current command values in the stationary coordinate system generated from the command phase θ_ref by the constant current controller 516.

The setting of switches 540 to 542 for switching the control mode is performed by a control switcher 530. The control switcher 530, in the vector control mode, sets the switch 541 so that the current controller 503 and the coordinate converter 505 are connected, and sets the switch 542 so that the A/D converter 510 and the coordinate converter 511 are connected. The control switcher 530 also sets the switch 541 so that the coordinate converter 505 is bypassed in the synchronous control mode, and sets the switch 542 so that the coordinate converter 511 is bypassed.

In the control loop including the current controller 503, based on the detected value of the driving current flowing through the windings of each phase of the motor 122, the driving current flowing through the windings of each phase of the motor 122 is controlled. Here, the driving currents (AC current) flowing through the windings of the A-phase and B-phase of the motor 122, respectively, are detected by the current detectors 507 and 508, then converted from an analog value to a digital value by the A/D converter 510. The current values of the driving currents converted from an analog value to a digital value by the A/D converter 510, as the current values iα and iβ in the stationary coordinate system, are expressed by the following equations. Incidentally, I indicates the magnitude of the amplitude of the current.

$$i\alpha = I^* \cos \theta$$

$$i\beta = I^* \sin \theta \qquad (1)$$

These current values iα and iβ are inputted to the coordinate converter 511 and the induced voltage determiner 512.

The coordinate converter 511, by the following equation, converts the current values iα and iβ in the stationary coordinate system to the current value iq of the q-axis current and the current value id of the d-axis current in the rotating coordinate system. Incidentally, the phase θ determined by the phase determiner 513 is outputted to the coordinate converters 505 and 511 as a phase θ_ctr for coordinate transformation.

$$id = \cos(\theta\_ctr)^* i\alpha + \sin(\theta\_ctr)^* i\beta$$

$$iq = -\sin(\theta\_ctr)^* i\alpha + \cos(\theta\_ctr)^* \beta \qquad (2)$$

The subtractor 553 takes as input the q-axis current command value iq_ref outputted from the switch 540 and the current value iq outputted from the coordinate converter 511. The subtractor 553 calculates the deviation between the q-axis current command value iq_ref and the current value iq, and outputs the deviation to the current controller 503. The subtractor 554 takes as input the d-axis current command value id_ref outputted from the switch 540 and the current value id outputted from the coordinate converter 511. The subtractor 554 calculates the deviation between the d-axis current command value id_ref and the current value id, and outputs the deviation to the current controller 503.

The current controller 503, based on PID control, generates a drive voltage Vq such that the deviation to be input becomes small. Specifically, the current controller 503 generates the drive voltage Vq so that the deviation input becomes 0 and outputs it to the coordinate converter 505. Also, the current controller 503, based on PID control, generates a drive voltage Vd such that the deviation to be input becomes small. Specifically, the current controller 503 generates the drive voltage Vd so that the deviation input becomes 0 and outputs it to the coordinate converter 505.

Incidentally, the current controller 503 in the present embodiment generates the drive voltages Vq and Vd based on PID control, but limitation is not made to this. For example, the current controller 503 may generate the drive voltages Vq and Vd based on the PI control.

The coordinate converter 505, by the following equation, inversely transforms the drive voltages Vq and Vd in the rotating coordinate system outputted from the current controller 503 into the drive voltage Vα and Vβ in the stationary coordinate system.

$$V\alpha = \cos(\theta\_ctr)^* Vd - \sin(\theta\_ctr)^* Vq$$

$$V\beta = \sin(\theta\_ctr)^* Vd + \cos(\theta\_ctr)^* Vq \qquad (3)$$

The coordinate converter 505 outputs the converted drive voltages Vα and Vβ to the PWM inverter 506, which is configured by a full bridge circuit, and an induced voltage determiner 512. Thus, the vector control unit 515 generates a drive voltage for driving the full bridge circuit included in the PWM inverter 506 so that the deviation between the driving currents detected by the current detectors 507 and 508 and the driving currents to be supplied to the windings of the motor 122 is reduced.

The full bridge circuit included in the PWM inverter 506 is driven by a PWM (pulse width modulation) signal based on the drive voltages Vα and Vβ inputted from the coordinate converter 505. As a result, the PWM inverter 506 generates driving currents iα and iβ corresponding to the drive voltages Vα and Vβ, and drives the motor 122 by supplying the driving currents iα and iβ to the windings of each phase of the motor 122. Note that the PWM inverter 506 may include a half bridge circuit or the like.

(Sensorless Control)

Next, a method of determining (estimating) the rotational phase θ will be described. The determination of the rotational phase θ of the rotor 401 uses the values of the induced voltages (counter-electromotive voltages) Eα and Eβ that are induced in the windings of the A-phase and B-phase of the motor 122 by the rotation of the rotor 401.

The values of the induced voltages Eα and Eβ are determined (calculated) by the induced voltage determiner 512. Specifically, the induced voltages Eα and Eβ are determined by the following equations from the current values iα and iβ inputted from the A/D converter 510 to the induced voltage determiner 512 and the drive voltages Vα and Vβ inputted from the coordinate converter 505 to the induced voltage determiner 512.

$$E\alpha = V\alpha - R^* i\alpha - L^* di\alpha/dt$$

$$E\beta = V\beta - R^* - L\beta^* di\beta/dt \quad (4)$$

Here, R is the winding resistance and L is the winding inductance. The values of the winding resistance R and the winding inductance L are values unique to the motor 122 being used, and are stored in advance in the ROM 252 or a memory (not shown) provided in the motor control unit 123. The induced voltages Eα and Eβ determined by the induced voltage determiner 512 are input to the phase determiner 513.

The phase determiner 513, from the ratio between the induced voltage Eα and the induced voltage Eβ output from the induced voltage determiner 512, determines (estimates) the rotational phase θ of the rotor 401 of the motor 122 by the following equation.

$$\theta = \tan^{-1}(-E\beta/E\alpha) \quad (5)$$

In the present embodiment, the phase determiner 513 determines the rotational phase θ by performing the calculation based on Equation (5), but there is no limitation to this. For example, the phase determiner 513 may determine (estimate) the rotational phase θ by referring to a table that is stored in the ROM 252 or the like and that indicates the relationship between the induced voltages Eα and Eβ and the rotational phase θ corresponding to the induced voltages Eα and Eβ.

The rotational phase θ of the rotor 401 obtained in this manner is input to the subtractor 551, the speed determiner 514, and the switch 540. The speed determiner 514, based on the temporal change of the inputted rotational phase θ, determines (estimates) the rotational speed ω of the rotor 401 of the motor 122 by the following equation.

$$\omega = d\theta/dt \quad (6)$$

The speed determiner 514 outputs the rotational speed ω to the subtractor 552.

As described above, the motor control unit 123 of the present embodiment, in the vector control mode, performs vector control using phase feedback control for controlling the current value in the rotating coordinate system so that the deviation between the command phase θ_ref and the rotational phase A is reduced. By performing the vector control, it is possible to suppress the motor from entering a step-out state and motor noise increasing and power consumption increasing due to surplus torque.

(Synchronous Control Mode)

Next, description is given regarding the configuration and operation related to the synchronous control mode (constant current control) in the motor control unit 123.

In the constant current control, so that the motor does not step out even if a variation in the load torque applied to the rotor occurs, a driving current having a magnitude corresponding to a torque resulting from adding a predetermined margin to the torque assumed to be required for rotation of the rotor (amplitude) is supplied to the windings. This is because, in the constant current control, a configuration in which the magnitude of the driving current is controlled based on the determined (estimated) rotational phase and rotational speed is not used (feedback control is not performed), and so the driving current cannot be adjusted in accordance with the load torque applied to the rotor. Note that the larger the magnitude of the current, the larger the torque applied to the rotor becomes. The amplitude also corresponds to the magnitude of the current vector.

In the following description, during the constant current control, the motor is controlled by a current of a predetermined magnitude that is defined in advance being supplied to the windings of the motor, but limitation is not made to this. For example, during the constant current control, the motor may be controlled by respective predetermined magnitudes of current being supplied to the windings of the motor in accordance with each of acceleration and deceleration of the motor.

The motor control unit 123, in the synchronous control mode, as described below, controls the driving current supplied to the motor 122 so that a driving current predetermined in accordance with the driving target load of the motor 122 flows in the windings of the motor 122.

In the synchronous control mode, the constant current controller 516 generates command values iα_ref and iβ_ref for current in the stationary coordinate system corresponding to the command phase θ_ref outputted from the phase command generator 500, and outputs them to the switch 540. In the present embodiment, the magnitude of the current vector corresponding to the current command values iα_ref and iβ_ref in the stationary coordinate system, which is generated by the constant current controller 516, is always constant. The current command values iα_ref and iβ_ref outputted from the constant current controller 516 are inputted to the subtractors 553 and 554, respectively, via the switch 540.

The driving current flowing through the windings of the A-phase and B-phase of the motor 122 is detected by the current detectors 507 and 508. The detected driving current is converted from an analog value to a digital value by the A/D converter 510, as previously described. Since the coordinate converter 511 is bypassed in the synchronous control mode, the current values iα and iβ outputted from the A/D converter 510 are not inputted to the coordinate converter 511, but are inputted to the subtractors 553 and 554, respectively.

The subtractor 552 calculates the deviation between the current value iα outputted from the A/D converter 510 and the current command value iα_ref outputted from the constant current controller 516, and outputs the deviation to the current controller 503. Also, the subtractor 553 calculates the deviation between the current value iβ outputted from the A/D converter 510 and the current command value iβ_ref outputted from the constant current controller 516, and outputs the deviation to the current controller 503.

The current controller 503 outputs drive voltages Vα and Vβ based on the PID control so that the deviation to be input is reduced. Specifically, the current controller 503 outputs the drive voltages Vα and Vβ so that the deviation input approaches 0. The PWM inverter 506, in the manner described above, drives the motor 122 by supplying a driving current to the windings of each phase of the motor 122, based on the inputted drive voltages Vα and Vβ.

Thus, in the synchronous control mode (constant current control) in the present embodiment, neither phase feedback control nor speed feedback control are performed. That is, in the constant current control in the present embodiment, the driving current supplied to the windings of the motor 122 is not adjusted according to the rotation state of the rotor 401. Therefore, in the synchronous control mode, a current resulting from a predetermined margin being added to the current required to rotate the rotor 401 is supplied to the winding, so that the motor 122 does not enter a step-out state. Specifically, the current command values is ref and iβ_ref in the stationary coordinate system include a current value necessary for rotating the rotor 401 and a current value corresponding to the predetermined margin.

<Movement Mechanism for Flow Reading Glass>

The glass unit 125 is configured to be driven and moved by the motor 122. The motor 122 is coupled to a camshaft 114 of a cam 113. As the rotor 401 of the motor 122 rotates, the driving force from the motor 122 is transmitted to the cam 113 through the camshaft 114. The cam 113 is a cam mechanism configured to move the glass unit 125 by being driven and rotated by motor 122.

In the present embodiment, as described above, the motor 122 is used not only as a driving source (first driving source) for rotating the roller for conveying documents at a predetermined speed, but also as a driving source (second driving source) for positioning of the flow reading glass 101 by driving the cam 113. Further, the movement mechanism for the glass unit 125 is configured to transmit the driving force from the motor 122 to the cam 113 only when the rotor 401 of the motor 122 rotates in a second rotational direction that is opposite to a first rotational direction (for example, the CW direction) at the time of document conveyance.

Thus, the motor 122 is configured such that, when the rotor 401 is rotating in the first rotational direction, the driving force from the motor 122 is not transmitted to the cam 113 but is transmitted to the rollers for conveying documents. Further, the motor 122 is configured such that, when the rotor 401 is rotating in the second rotational direction, the driving force from the motor 122 is not transmitted to the rollers for conveying documents but is transmitted to the cam 113.

By the driving force from the motor 122 is transmitted to the cam 113, and the cam 113 rotating in the direction of an arrow 610 illustrated in FIGS. 2A and 2B, the glass unit 125 is reciprocated in a movement range including a first stop position and a second stop position. The glass unit 125 is controlled so as to stop at the first stop position shown in FIG. 2A when the reading of the double-sided document is performed in the flow reading mode. On the other hand, when shading is performed using the shading white plate 110, the glass unit 125 is controlled to stop at the second stop position shown in FIG. 2B.

For control of the movement of the glass unit 125 between the first stop position of FIG. 2A and the second stop position of FIG. 2B, a glass HP sensor 111 is provided in the vicinity of the glass unit 125. The CPU 251 controls an amount of movement of the glass unit 125 based on a change in the output of the glass HP sensor 111. The glass HP sensor 111 is configured by, for example, a photointerrupter having a light-emitting portion and a light-receiving portion facing each other. The glass HP sensor 111 is disposed at a position where light which is directed from the light-emitting portion toward the light-receiving portion is blocked by the glass unit 125 due to the movement of the glass unit 125.

The glass HP sensor 111 outputs a signal indicating the light reception result of the light-receiving portion (a signal indicating whether or not the light is blocked). For example, if the glass unit 125 is stopped in the first stop position, the glass HP sensor 111 outputs a signal indicating that the light is not blocked. Also, if the glass unit 125 is stopped in the second stop position, the glass HP sensor 111 outputs a signal indicating that the light is blocked.

The CPU 251 causes the glass unit 125 to stop at a timing at which the glass unit 125 has moved a predetermined distance from the timing when the output of the glass HP sensor 111 changed. Thus, the glass unit 125 can be stopped at a desired position (the first stop position in FIG. 2A or the second stop position in FIG. 2B). As described above, since the glass unit 125 is moved by the driving force from the motor 122, the CPU 251 can control the amount of movement of the glass unit 125 by counting the drive pulses for driving the motor 122.

<Control Mode Switching>

The motor control unit 123 (control switcher 530), when applying the vector control mode as a control mode for control of the motor 122, switches the control mode between the synchronous control mode and the vector control mode in accordance with the rotational speed $\omega\_ref$ of the rotor 401. The rotational speed $\omega\_ref$ of the rotor 401 is a rotational speed corresponding to the target speed of the rotor 401. For example, when the rotational speed $\omega\_ref$ is less than a predetermined value (less than the threshold value $\omega\_th$) ($\omega\_ref<\omega\_th$), the control switcher 530 sets the control mode to the synchronous control mode. On the other hand, when the rotational speed $\omega\_ref$ is equal to or greater than a predetermined value (equal to or greater than the threshold value equal to or greater than $\omega\_th$) ($\omega\_ref \geq \omega\_th$), the control switcher 530 sets the control mode to the vector control mode.

According to such a control, after the rotor 401 of the motor 122 starts to rotate, the motor 122 is controlled in the synchronous control mode until the rotational speed exceeds the threshold value $\omega\_th$. Thereafter, when the rotational speed of the rotor 401 becomes equal to or higher than the threshold value (greater than or equal to $\omega\_th$), the control mode is switched from the synchronous control mode to the vector control mode. Further, usually the control mode is switched from the vector control mode to the synchronous control mode when the rotational speed becomes smaller than the threshold value $\omega\_th$ after the rotor 401 starts decelerating when rotation of the rotor 401 is to be stopped. In this way, it is possible to apply the vector control mode as a control mode for control of the motor 122. Thus, for example, when the motor 122 is used as a driving source of a roller for document conveyance, it is possible to reduce power consumption and motor noise.

However, when using the motor 122 as a driving source for performing positioning by moving a moving object such as the flow reading glass 101, when the vector control mode is applied as described above, there is a possibility that the positioning of the stop position of the moving object cannot be performed with high accuracy. Specifically, due to the deviation between the command phase and the rotational phase that occurs when switching from the vector control mode to the synchronous control mode in order to stop the rotation of the rotor 401 remaining until the rotor 401 stops, the moving object cannot be stopped at a desired position. At this time, the positioning accuracy of the stop position of the moving object may be lower than when applying only the synchronous control mode as the control mode.

For example, in a case where the glass unit 125 is moved by controlling the motor 122 in the vector control mode, the stop position of the shading white plate 110 may deviate from the second stop position (FIG. 2B). As a result, shading (shading correction) using the shading white plate 110 cannot be appropriately performed, which may lead to the quality of the read image suffering.

Therefore, in the present embodiment, the motor control unit 123 applies the vector control mode when the motor 122 is used as a driving source (first driving source) for rotating the roller (rotating body) for conveying documents at a predetermined speed (rotating in the first rotational direction). That is, the motor control unit 123, in accordance with the rotational speed ω_ref of the rotor 401, executes switching of the control mode between the synchronous control mode and the vector control mode. Meanwhile, the motor control unit 123 applies the synchronous control mode in a case where the motor 122 is used as a driving source (second driving source) for positioning the flow reading glass 101 (moving object) by causing it to move by driving the cam 113 (rotation in the second rotational direction). That is, the motor control unit 123 executes the synchronous control mode regardless of the rotational speed ω_ref of the rotor 401. Accordingly, while the vector control mode is applied to the document conveyance control, the positioning accuracy of the stop position of the flow reading glass 101 (the moving object) is prevented from suffering due to the application of the vector control mode as described above.

<Example of Control Sequence>

Figure 6A:
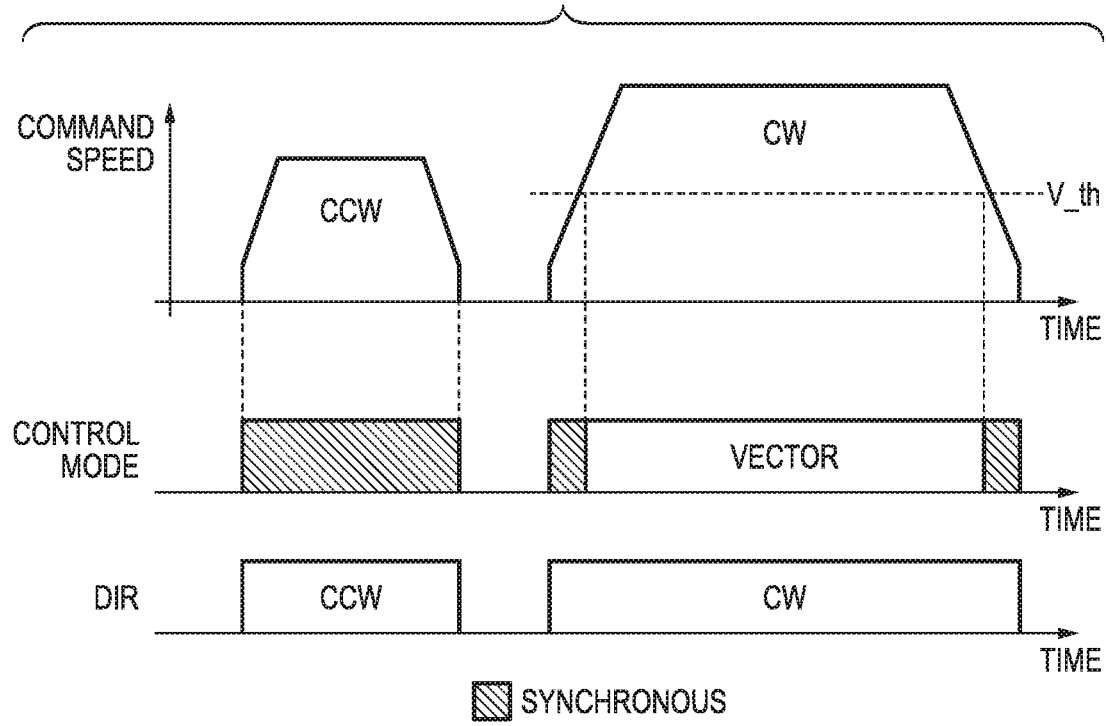
FIG. 6A and FIG. 6B show examples of control sequences in accordance with the motor control unit.

FIG. 6A illustrates an example of a control sequence by the motor control unit 123 according to the present embodiment. In FIG. 6A, in order from the top part, an example of the temporal change of the command value of the rotational speed of the rotor 401 of the motor 122 (command speed), the control mode for controlling the motor 122, and the command value DIR for the rotational direction of the rotor 401 is illustrated.

As described above, the rotor 401 of the motor 122 is rotated in a direction (the CCW direction in this example) opposite to the rotational direction (the CW direction in this example) at the time of document conveyance, so that the motor 122 is used as a driving source for positioning the flow reading glass 101 by driving the cam 113. In example of FIG. 6A, if the motor 122 is used as a driving source for positioning the flow reading glass 101, a command value DIR indicating the CCW direction is outputted from the CPU 251 to the motor control unit 123. In the motor control unit 123, based on the command value DIR indicating the CCW direction, the control switcher 530 sets the control mode to the synchronous control mode. In this way, when the motor 122 is used as a driving source for positioning the flow reading glass 101, the motor 122 is controlled in the synchronous control mode. In this case, the synchronous control mode is continued regardless of the command speed. Thus, it is possible to prevent the positioning accuracy of the stop position of the flow reading glass 101 from suffering due to the application of the vector control mode.

In the example of FIG. 6A, thereafter, the motor 122 is being used as a driving source for rotating the roller for conveying the document (the sheet discharge roller 11 in this example) at a predetermined speed by the command value DIR indicating the CW direction being output from the CPU 251 to the motor control unit 123. In the motor control unit 123, based on the command value DIR indicating the CW direction, the control switcher 530 sets the control mode to the vector control mode. In this way, when the motor 122 is used as a driving source for conveying a document, the motor 122 is controlled in the vector control mode in accordance with the command speed, thereby reducing power consumption and motor noise.

<Control Procedure for Motor Control Unit>

Figure 7:
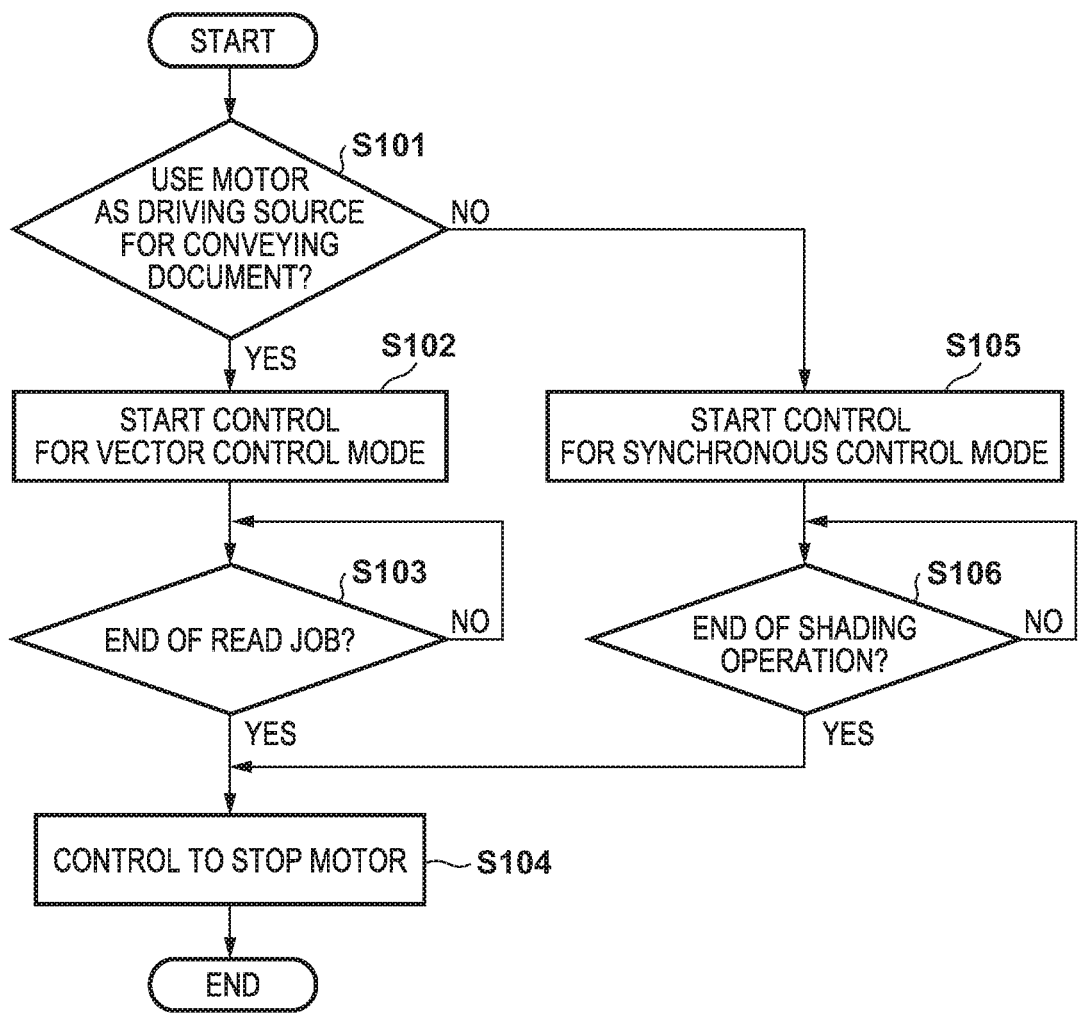
FIG. 7 is a flowchart showing a control procedure for the motor control unit.

FIG. 7 is a flowchart showing a control procedure for the motor control unit 123, which is executed by the CPU 251. The CPU 251 starts the execution of the control procedure of FIG. 7 at the time of starting the execution of a read job for conveying a document by using the document feeding apparatus 201 and reading an image thereon, or at the time of starting the shading operation by using the shading white plate 110.

First, in step S101, the CPU 251 determines whether or not the motor 122 is to be used as a driving source for conveying a document. The CPU 251 determines to use the motor 122 as the driving source for conveying the document when executing a read job (in the present example, as a driving source of the sheet discharge roller 11), and advances the process to step S102. On the other hand, when performing the shading operation, the CPU 251 determines to use the motor 122 as the driving source for positioning the flow reading glass 101, and advances the process to step S105.

In step S102, the CPU 251 starts control for the vector control mode in relation to the motor control unit 123. Specifically, the CPU 251 outputs to the motor control unit 123 a drive pulse corresponding to the command speed as illustrated in the control sequence on the right side of FIG. 6A and a command value DIR indicating the CW direction (first rotational direction).

The control switcher 530 of the motor control unit 123 determines which of the synchronous control mode and the vector control mode is to be applied based on the rotational direction indicated by the command value DIR outputted from the CPU 251. The control switcher 530 determines to apply the vector control mode when the command value DIR indicates the CW direction. In this case, the control switcher 530, as described above, in accordance with the rotational speed ω_ref of the rotor 401, executes switching between the synchronous control mode and the vector control mode.

Thereafter, in step S103, the CPU 251 determines whether or not the read job has finished executing, and if it determines that the read job has finished, it advances the processing to step S104. In step S104, the CPU 251, by controlling the drive pulses output to the motor control unit 123 such that the motor control unit 123 stops the motor 122, performs control for stopping the motor 122, and ends the processing.

Also, in step S105, the CPU 251 starts control for the synchronous control mode in relation to the motor control unit 123. Specifically, the CPU 251 outputs to the motor control unit 123 a drive pulse corresponding to the command speed as illustrated in the control sequence on the left side of FIG. 6A and the command value DIR indicating the CCW direction (the second rotational direction of the reverse direction to the first rotational direction).

The control switcher 530 of the motor control unit 123 determines to apply the synchronous control mode when the command value DIR indicates the CCW direction. In this case, the control switcher 530, as described above, executes the synchronous control mode regardless of the rotational speed ω_ref of the rotor 401.

Thereafter, in step S106, the CPU 251 determines whether or not the shading operation has finished, and if it determines that the shading operation has finished, the CPU 251 advances the processing to step S104. In step S104, the CPU 251, by controlling the drive pulses outputted to the motor control unit 123 such that the motor control unit 123 stops the motor 122, performs stop control of the motor 122, and ends the processing.

As described above, the motor control unit 123 of the present embodiment has a synchronous control mode for performing synchronous control of the motor 122, and a vector control mode for performing vector control of the motor 122. The motor 122 is configured to be used as a first driving source for rotating a conveying roller (a rotating body) such as a sheet discharge roller 11 at a predetermined speed, and a second driving source for moving and positioning the flow reading glass 101 (moving object). When the motor 122 is used as a first driving source, the control switcher 530 switches between the synchronous control mode and the vector control mode in accordance with the rotational speed ω_ref of the rotor 401 represented by drive pulses supplied from the CPU 251, which is a higher level controller. On the other hand, the control switcher 530, executes the synchronous control mode when the motor 122 is used as a second driving source.

In this manner, when the motor 122 is used as the second driving source for positioning the moving object, the vector control mode is not executed, and the synchronous control mode is executed regardless of the rotational speed ω_ref. Thus, it is possible to prevent the moving object positioning accuracy from suffering due to the application of the vector control mode. That is, in motor control to which vector control can be applied, it is possible to prevent the positioning accuracy from suffering when using the motor 122 as a driving source for positioning the moving object. Further, when the motor 122 is used as a first driving source, it is possible to reduce power consumption and motor noise by the application of vector control.

Second Embodiment

In the first embodiment, description was given of an example in which the movement mechanism of the glass unit 125 is configured to switch whether or not to transmit the driving force from the motor 122 to the cam 113 in accordance with the rotational direction of the rotor 401 of the motor 122. In the second embodiment, an example of control for driving the motor 122 by the motor control unit 123 for a case where the movement mechanism of the glass unit 125 is configured to switch whether to transmit the driving force from the motor 122 to the cam 113 using an electromagnetic clutch will be described. Note that below, mainly differences from the first embodiment will be described.

<Movement Mechanism for Flow Reading Glass>

Figure 8:
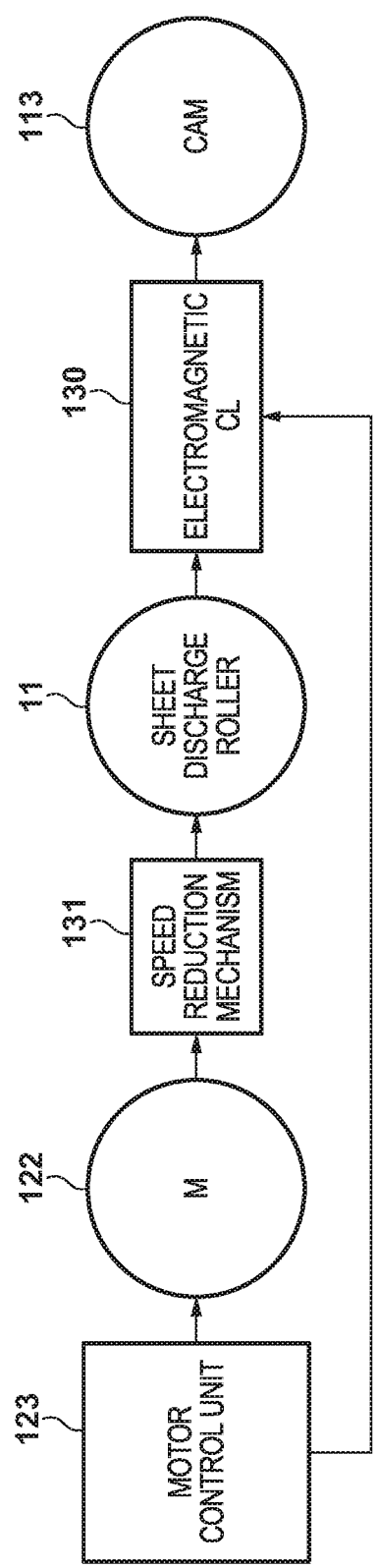
FIG. 8 is a block diagram showing a configuration example of cam driving.

FIG. 8 is a block diagram showing an example of a drive configuration of the cam 113 for moving the flow reading glass 101 according to the present embodiment. In the present embodiment, similarly to the first embodiment, it is assumed that a motor 122 is used as a driving source (first driving source) for causing a roller for conveying a document (in this example, the sheet discharge roller 11 is used) to rotate at a predetermined speed and as a driving source (second driving source) for positioning the flow reading glass 101 by driving the cam 113.

As shown in FIG. 8, the driving force from the motor 122 is transmitted to the sheet discharge roller 11 through a speed reduction mechanism 131 configured by gears, a timing belt, or the like. An electromagnetic clutch 130 is provided between the sheet discharge roller 11 and the cam 113. The electromagnetic clutch (CL) 130 is controlled by the motor control unit 123 similarly to the motor 122. When the electromagnetic clutch 130 is in the off state, the driving force from the motor 122 is transmitted only to the sheet discharge roller 11. On the other hand, when the electromagnetic clutch 130 is in the on state, the driving force from the motor 122 is further transmitted via the sheet discharge roller 11 to the cam 113.

According to the configuration example of FIG. 8, when the motor 122 is used as a driving source for conveying a document, the electromagnetic clutch 130 is turned off by the motor control unit 123. On the other hand, when the motor 122 is used as a driving source (of the cam 113) for positioning the flow reading glass 101, the electromagnetic clutch 130 is turned on by the motor control unit 123. Thus, the driving force from the motor 122 is transmitted to the cam 113 through the sheet discharge roller 11 to thereby drive the cam 113. That is, it is possible to perform positioning by moving the flow reading glass 101 by driving the cam 113.

In this way, when the document is conveyed, the electromagnetic clutch 130 is turned off, so that only the sheet discharge roller 11 is driven by the motor 122. In addition, during the shading operation using the shading white plate 110, the electromagnetic clutch 130 is turned on, so that the sheet discharge roller 11 and the cam 113 are driven, and the flow reading glass 101 can be moved to perform positioning.

In the present embodiment, instead of the command value DIR, the CPU 251 outputs to the motor control unit 123 a command value CL for controlling the electromagnetic clutch 130. The control switcher 530 of the motor control unit 123 turns on or off the electromagnetic clutch 130 in accordance with the command value CL from the CPU 251. The switching between the on state and the off state of the electromagnetic clutch 130 may be performed using a switching element such as a transistor (not shown) provided inside the motor control unit 123.

<Example of Control Sequence>

Figure 6B:
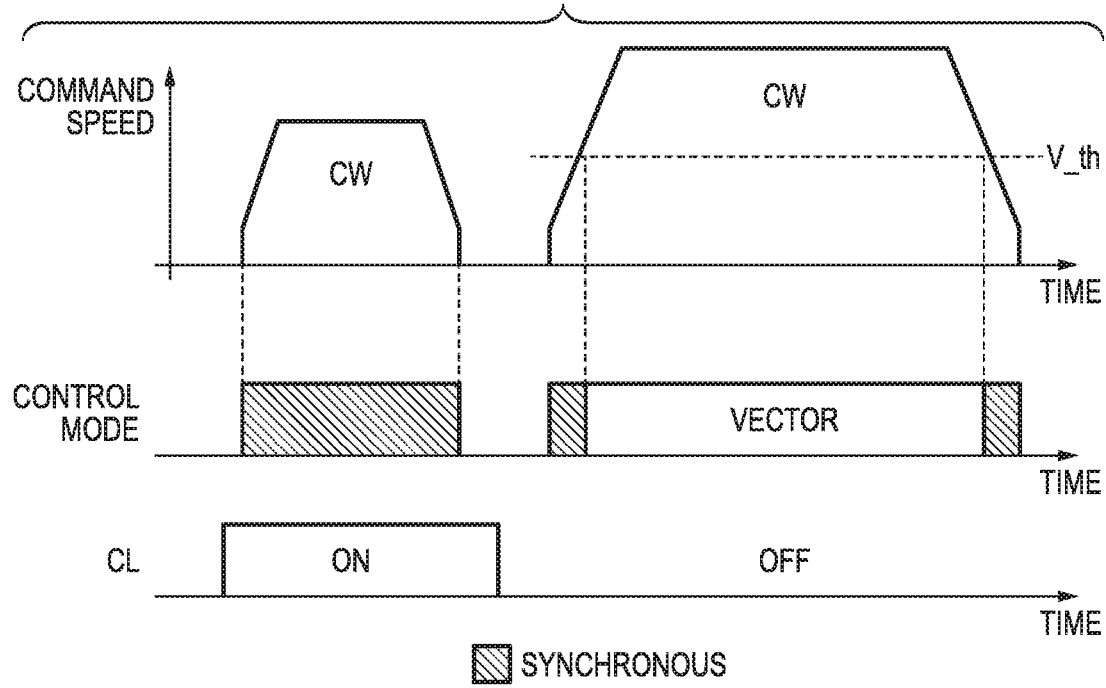

FIG. 6B illustrates an example of a control sequence by the motor control unit 123 according to the present embodiment. In FIG. 6B, in order from the top part, an example of the temporal change of the command value of the rotational speed of the rotor 401 of the motor 122 (command speed), the control mode for controlling the motor 122, and the command value CL for control of the electromagnetic clutch 130 is illustrated.

In the present embodiment, the electromagnetic clutch 130 is turned on to use the motor 122 as a driving source for positioning the flow reading glass 101 by driving the cam 113. In example of FIG. 6B, if the motor 122 is used as a driving source for positioning the flow reading glass 101, a command value CL indicating the on state is outputted from the CPU 251 to the motor control unit 123. In the motor control unit 123, based on the command value CL indicating the on state, the control switcher 530 sets the control mode to the synchronous control mode. In this way, when the motor 122 is used as a driving source for positioning the flow reading glass 101, the motor 122 is controlled in the synchronous control mode. In this case, the synchronous control mode is continued regardless of the command speed. Thus, it is possible to prevent the positioning accuracy of the stop position of the flow reading glass 101 from suffering due to the application of the vector control mode.

In the example of FIG. 6B, thereafter, the motor 122 is being used as a driving source for rotating the roller for conveying the document (the sheet discharge roller 11 in this example) at a predetermined speed by the command value CL indicating the off state being output from the CPU 251 to the motor control unit 123. In the motor control unit 123, based on the command value CL indicating the off state, the control switcher 530 sets the control mode to the vector control mode. In this way, when the motor 122 is used as a driving source for conveying a document, the motor 122 is controlled in the vector control mode in accordance with the command speed, thereby reducing power consumption and motor noise.

<Control Procedure for Motor Control Unit>

The control procedure performed by the CPU 251 for the motor control unit 123 is similar to that in the first embodiment (FIG. 7).

In the present embodiment, in step S102, the CPU 251 outputs to the motor control unit 123 a drive pulse corresponding to the command speed as illustrated in the control sequence on the right side of FIG. 6B, and a command value CL indicating the off state. The control switcher 530 of the motor control unit 123 determines which of the synchronous control mode and the vector control mode is to be applied based on the command value CL outputted from the CPU 251. The control switcher 530 determines to apply the vector control mode when the command value CL indicates the off state. In this case, the control switcher 530, as described above, in accordance with the rotational speed ω_ref of the rotor 401, executes switching between the synchronous control mode and the vector control mode.

Also, in step S105, the CPU 251 outputs to the motor control unit 123 a drive pulse corresponding to the command speed as illustrated in the control sequence on the left side of FIG. 6B, and a command value CL indicating the on state. The control switcher 530 of the motor control unit 123 determines to apply the synchronous control mode when the command value CL indicates the on state. In this case, the control switcher 530, as described above, executes the synchronous control mode regardless of the rotational speed ω_ref of the rotor 401.

As described above, according to the present embodiment, similarly to the first embodiment, when the motor 122 is used as the second driving source for positioning the moving object, the synchronous control mode, not the vector control mode, is executed regardless of the rotational speed ω_ref. Thus, it is possible to prevent the moving object positioning accuracy from suffering due to the application of the vector control mode. That is, in motor control to which vector control can be applied, it is possible to prevent the positioning accuracy from suffering when using the motor 122 as a driving source for positioning the moving object. Further, when the motor 122 is used as a first driving source, it is possible to reduce power consumption and motor noise by the application of vector control.

In the above-described first and second embodiments, the sheet discharge roller 11 is assumed to be a roller that shares the motor 122 as a driving source with the cam 113, but this is only an example. The cam 113 and other rollers (for example, any one of the pickup roller 3, the sheet feeding roller 4, the separation roller 5, the conveying roller 53, and the conveying roller 54) may share the motor 122 as a driving source.

In the first and second embodiments, a configuration for selecting whether or not to execute the vector control mode according to the rotational direction is applied to the image reading apparatus 200, but limitation is not made to this. For example, the above-described configuration may be applied to the image printing apparatus 301. Specifically, for example, the above-described control may be applied to a motor that drives a fixing roller provided in the fixing unit 318 when rotating in the first rotational direction, and that moves the fixing roller to adjust the pressure of a nip portion of the fixing roller when rotating in the second rotational direction. More specifically, a configuration in which the vector control mode is applied in the case of driving the fixing roller, and in which the synchronous drive mode is executed regardless of the command speed in a case of moving the fixing roller to adjust the pressure of the nip portion of the fixing roller may also be applied.

Incidentally, in the motor control unit 123 in the first and second embodiments described above, some of the circuit for performing the synchronous control and the circuit for performing the vector control (constant current control) is common (current controllers 503 and 504, the PWM inverter 506, etc.), but limitation is not made to that. For example, a configuration in which the circuit for performing the synchronous control and the circuit for performing the vector control are provided independently may be used. In the above-described embodiment, a motor having two-phase windings is used, but another motor such as a three-phase motor may be used. In the above-described embodiment, a permanent magnet is used as the rotor 401, but the present invention is not limited thereto.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-128655, filed Jul. 10, 2019, which is hereby incorporated by reference herein in its entirety.

What is claimed is:

1. An image reading apparatus comprising:
a conveying roller configured to convey a document;

23 a first reading device configured to read, at a reading position, an image of a document conveyed by the conveying roller;
a discharging roller configured to discharge the document whose image has been read by the first reading device; and
a motor configured to drive a first load by rotating in a first direction and to drive a second load by rotating in a second direction that is a reverse direction to the first direction; and
a motor control apparatus configured to control the motor, wherein the motor control apparatus comprising:
a detector configured to detect a driving current flowing through a winding of the motor;
a phase determiner for determining a rotational phase of a rotor of the motor based on the driving current detected by the detector; and
a controller having a first control mode for controlling the driving current flowing through the winding based on a current of a predetermined magnitude, and a second control mode for controlling the driving current flowing through the winding so that a deviation between a command phase representing a target phase of the rotor and the rotational phase determined by the phase determiner is reduced,
wherein the controller executes the first control mode without executing the second control mode in a case of rotating the motor in the first direction, and
wherein, in a case of rotating the motor in the second direction, the controller starts controlling the driving current by the first control mode, and switches a control mode for controlling the driving current to the second control mode from the first control mode in a case where a value corresponding to a rotational speed of the rotor changes from a value smaller than a predetermined value to a value greater than the predetermined value during the execution of the first control mode.

2. The image reading apparatus according to claim 1, further comprising:
a reading unit comprising a first transparent member on which a document is placed, and a second reading device configured to read an image of the document placed on the first transparent member, and
a document feeding unit comprising the conveying roller, the first reading device and the discharging roller, the document feeding unit being disposed on the reading unit and rotatable with respect to the reading unit.

3. The image reading apparatus according to claim 2,
wherein the first reading device includes: a second transparent member through which the first reading device reads the image of the document at the reading position; and a white reference member,
wherein the first reading device performs shading correction based on a result of the first reading device reading the white reference member,
wherein the image reading apparatus comprises a moving unit configured to move the white reference member between the read position and a predetermined position, the predetermined position being a position at which the white reference member is not read by the first reading device; and
wherein the motor is configured to drive the moving unit serving as the first load, by rotating in the first direction,
wherein the first reading device is configured to read the white reference member in a state in which the white reference member is positioned at the read position,

24 and to read an image of the document in a state where the white reference member is positioned at the predetermined position.

4. The image reading apparatus according to claim 3,
wherein the white reference member is provided on the second transparent member, and
the moving unit moves the white reference member between the read position and the predetermined position by moving the second transparent member.

5. The image reading apparatus according to claim 3,
wherein the motor is configured to drive the discharging roller serving as the second load, by rotating in the second direction.

6. The image reading apparatus according to claim 1,
further comprising a generator configured to generate a pulse train including a plurality of pulses,
wherein the second control mode is a control mode for controlling the driving current so that the deviation between the command phase based on the pulse generated by generator and the rotational phase determined by the phase determiner is reduced.

7. The image reading apparatus according to claim 6,
wherein the value corresponding to the rotational speed of the rotor is a value indicating a frequency of the pulse train generated by the generator.

8. The image reading apparatus according to claim 1,
further comprising a voltage determiner configured to determine an induced voltage induced in the winding, based on the driving current detected by the detector,
wherein the phase determiner determines the rotational phase of the rotor based on the induced voltage determined by the voltage determiner.

9. The image reading apparatus according to claim 1,
wherein a target value of a torque current component is set so that the deviation is reduced, and the second control mode is a control mode in which the driving current is controlled so that a deviation between the target value and a value of a torque current component of the driving current detected by detector is reduced, and the torque current component is a current component that generates a torque in the rotor and that is represented in a rotating coordinate system with reference to the rotational phase determined by the phase determiner.

10. The image reading apparatus according to claim 1,
wherein the motor is a stepping motor.

11. An image reading apparatus, comprising:
a conveying roller configured to convey a document;
a first reading device configured to read, at a reading position, an image of a document conveyed by the conveying roller;
a discharging roller configured to discharge the document whose image has been read by the first reading device; and
a motor configured to drive a first load by rotating in a first direction and to drive a second load by rotating in a second direction that is a reverse direction to the first direction; and
a motor control apparatus configured to control the motor, wherein the motor control apparatus comprising:
a detector configured to detect a driving current flowing through a winding of the motor;
a speed determiner configured to determine a rotational speed of a rotor of the motor based on the driving current detected by the detector; and
a controller having a first control mode for controlling the driving current flowing through the winding based on a current of a predetermined magnitude, and a second control mode for controlling the driving current flowing through the winding so that a deviation between a command speed representing a target speed of the rotor and the rotational speed determined by the speed determiner is reduced, wherein the controller executes the first control mode without executing the second control mode in a case of rotating the motor in the first direction, and wherein, in a case of rotating the motor in the second direction, the controller starts controlling the driving current by the first control mode, and switches a control mode for controlling the driving current to the second control mode from the first control mode in a case where a value corresponding to a rotational speed of the rotor changes from a value smaller than a predetermined value to a value greater than the predetermined value during the execution of the first control mode.

12. The image reading apparatus according to claim 11, further comprising:
a reading unit comprising a first transparent member on which a document is placed, and a second reading device configured to read an image of the document placed on the first transparent member; and
a document feeding unit comprising the conveying roller, the first reading device and the discharging roller, and the document feeding unit being disposed on the reading unit rotatably with respect to the reading unit.

13. The image reading apparatus according to claim 12, wherein the first reading device includes a second transparent member through which the first reading device reads the image of the document at the reading position, and a white reference member,
wherein the first reading device performs shading correction based on a result of the first reading device reading the white reference member,
wherein the image reading apparatus comprises a moving unit configured to move the white reference member between the read position and a predetermined position, the predetermined position being a position at which the white reference member is not read by the first reading device,
wherein the motor is configured to drive the moving unit serving as the first load, by rotating in the first direction, and
wherein the first reading device is configured to read the white reference member in a state in which the white reference member is positioned at the read position, and to read an image of the document in a state where the white reference member is positioned at the predetermined position.

14. The image reading apparatus according to claim 13, wherein the white reference member is provided on the second transparent member, and
the moving unit moves the white reference member between the read position and the predetermined position by moving the second transparent member.

15. The image reading apparatus according to claim 13, wherein the motor is configured to drive the discharging roller serving as the second load, by rotating in the second direction.

16. The image reading apparatus according to claim 11, further comprising a generator configured to generate a pulse train including a plurality of pulses,
wherein the second control mode is a control mode for controlling the driving current so that the deviation between the command speed based on the pulse generated by generator and the rotational speed determined by the speed determiner is reduced.

17. The image reading apparatus according to claim 16, wherein the value corresponding to the rotational speed of the rotor is a value indicating a frequency of the pulse train generated by the generator.

18. The image reading apparatus according to claim 11, further comprising a voltage determiner configured to determine an induced voltage induced in the winding, based on the driving current detected by the detector,
wherein the speed determiner determines the rotational speed of the rotor based on the induced voltage determined by the voltage determiner.

19. The image reading apparatus according to claim 11, further comprising a phase determiner configured to determine a rotational phase of the rotor,
wherein a target value of a torque current component is set so that the deviation is reduced, and the second control mode is a control mode in which the driving current is controlled so that a deviation between the target value and a value of a torque current component of the driving current detected by detector is reduced, and the torque current component is a current component that generates a torque in the rotor and that is represented in a rotating coordinate system with reference to the rotational phase determined by the phase determiner.

20. The image reading apparatus according to claim 11, wherein the motor is a stepping motor.

21. An image forming apparatus, comprising:
an image forming unit configured to form an image on a printing medium; and
a conveying roller configured to convey the printing medium;
a motor configured to drive a first load by rotating in a first direction and to drive a second load by rotating in a second direction that is a reverse direction to the first direction; and
a motor control apparatus configured to control the motor, wherein the motor control apparatus comprising:
a detector configured to detect a driving current flowing through a winding of the motor;
a phase determiner for determining a rotational phase of a rotor of the motor based on the driving current detected by the detector; and
a controller having a first control mode for controlling the driving current flowing through a winding of the motor based on a current of a predetermined magnitude, and a second control mode for controlling the driving current flowing through the winding so that a deviation between a command phase representing a target phase of the rotor and the rotational phase determined by the phase determiner is reduced,
wherein the controller executes the first control mode without executing the second control mode in a case of rotating the motor in the first direction, and
wherein, in a case of rotating the motor in the second direction, the controller starts controlling the driving current by the first control mode, and switches a control mode for controlling the driving current to the second control mode from the first control mode in a case where a value corresponding to a rotational speed of the rotor changes from a value smaller than a predetermined value to a value greater than the predetermined value during the execution of the first control mode.

22. An image forming apparatus, comprising:
an image forming unit configured to form an image on a printing medium; and a conveying roller configured to convey the printing medium;

a motor configured to drive a first load by rotating in a first direction and to drive a second load by rotating in a second direction that is a reverse direction to the first direction; and a motor control apparatus configured to control the motor, wherein the motor control apparatus comprising:

a detector configured to detect a driving current flowing through a winding of the motor;

a speed determiner configured to determine a rotational speed of a rotor of the motor based on the driving current detected by the detector; and a controller having a first control mode for controlling the driving current flowing through the winding based on a current of a predetermined magnitude, and a second control mode for controlling the driving current flowing through the winding so that a deviation between a command speed representing a target speed of the rotor and the rotational speed determined by the speed determiner is reduced, wherein the controller executes the first control mode without executing the second control mode in a case of rotating the motor in the first direction, and wherein, in a case of rotating the motor in the second direction, the controller starts controlling the driving current by the first control mode, and switches a control mode for controlling the driving current to the second control mode from the first control mode in a case where a value corresponding to a rotational speed of the rotor changes from a value smaller than a predetermined value to a value greater than the predetermined value during the execution of the first control mode.

* * * * *